(12) United States Patent
Tanigawa et al.

(10) Patent No.: US 8,521,849 B2
(45) Date of Patent: Aug. 27, 2013

(54) TRANSMISSION CONTROL DEVICE AND COMPUTER PROGRAM CONTROLLING TRANSMISSION OF SELECTED CONTENT FILE

(75) Inventors: Toshihiro Tanigawa, Osaka (JP); Hironori Nakano, Osaka (JP); Haruyo Ookubo, Osaka (JP)

(73) Assignee: Panasonic Corporation, Osaka (JP)

( * ) Notice: Subject to any disclaimer, the term of this patent is extended or adjusted under 35 U.S.C. 154(b) by 181 days.

(21) Appl. No.: 13/176,064

(22) Filed: Jul. 5, 2011

(65) Prior Publication Data

US 2012/0011272 A1 Jan. 12, 2012

(30) Foreign Application Priority Data

Jul. 8, 2010 (JP) ................................ 2010-155648

(51) Int. Cl.
 *G06F 15/16* (2006.01)
(52) U.S. Cl.
 USPC ........... 709/219; 709/224; 709/218; 709/217; 709/232
(58) Field of Classification Search
 USPC .................. 709/217, 219, 231, 249, 206, 207, 709/218, 224, 232; 725/109; 705/26.8; 715/704, 723; 702/187
 See application file for complete search history.

(56) References Cited

U.S. PATENT DOCUMENTS

| | | | |
|---|---|---|---|
| 2007/0255530 A1* | 11/2007 | Wolff | 702/187 |
| 2007/0266115 A1* | 11/2007 | Levin | 709/217 |
| 2009/0150570 A1* | 6/2009 | Tao et al. | 709/249 |
| 2010/0146393 A1* | 6/2010 | Land et al. | 715/723 |
| 2010/0161753 A1* | 6/2010 | Klassen et al. | 709/217 |
| 2010/0281178 A1* | 11/2010 | Sullivan | 709/231 |
| 2011/0154197 A1* | 6/2011 | Hawthorne et al. | 715/704 |
| 2011/0202424 A1* | 8/2011 | Chun et al. | 705/26.8 |
| 2011/0271314 A1* | 11/2011 | Hoshall | 725/109 |
| 2011/0276656 A1* | 11/2011 | Knapp et al. | 709/219 |

FOREIGN PATENT DOCUMENTS

JP 2004-023756 1/2004

* cited by examiner

*Primary Examiner* — Lee H Luu
(74) *Attorney, Agent, or Firm* — Renner, Otto, Boisselle & Sklar, LLP

(57) ABSTRACT

An electronic device is connected to a communication network, to which a server and an external device are connected. The electronic device includes an interface which receives an instruction from a user; a processor which determines information to be transmitted and a destination of the transmission based on the user's instruction; and a communication module which transmits the information to the destination. In the case where a content file is selected via the interface, when the selected content file has not been uploaded on the server, the communication module transmits the content file to the server, and after the transmission, transmits location information indicating a location where the content file is stored in the communication network to the external device. When the selected content file has been uploaded on the server, the communication module transmits the location information indicating the location where the content file is stored to the external device.

12 Claims, 6 Drawing Sheets

| FILE NAME | CONTENT ID | TOTAL REPRODUCTION TIME | REPRODUCTION TIME OF THE PART HAVING A HISTORY OF BEING UPLOADED | URL |
|---|---|---|---|---|
| MOVING PICTURE A | ID-0001 | 5:23 | 0:00–5:23 | http://xxxx/xxxx/0001-01 |
| MOVING PICTURE B | ID-0002 | 4:28 | 0:00–4:28 | http://xxxx/xxxx/0002-01 |
| MOVING PICTURE E | ID-0003 | 15:02 | 0:00–6:00 | http://xxxx/xxxx/0003-01 |
| MOVING PICTURE E | ID-0003 | 15:02 | 6:00–12:00 | http://xxxx/xxxx/0003-02 |

D400, D401, D402, D403

→

(B)

| FILE NAME | CONTENT ID | TOTAL REPRODUCTION TIME | REPRODUCTION TIME OF THE PART HAVING A HISTORY OF BEING UPLOADED | URL |
|---|---|---|---|---|
| MOVING PICTURE A | ID-0001 | 5:23 | 0:00–5:23 | http://xxxx/xxxx/0001-01 |
| MOVING PICTURE B | ID-0002 | 4:28 | 0:00–4:28 | http://xxxx/xxxx/0002-01 |
| MOVING PICTURE E | ID-0003 | 15:02 | 0:00–6:00 | http://xxxx/xxxx/0003-01 |
| MOVING PICTURE E | ID-0003 | 15:02 | 6:00–12:00 | http://xxxx/xxxx/0003-02 |
| MOVING PICTURE C | ID-0004 | 3:14 | 0:00–3:14 | http://xxxx/xxxx/0004-01 |
| MOVING PICTURE E | ID-0003 | 15:02 | 12:00–15:02 | http://xxxx/xxxx/0003-03 |

D400, D401, D402, D403, D404, D405

TRANSMISSION CONTROL DEVICE AND COMPUTER PROGRAM CONTROLLING TRANSMISSION OF SELECTED CONTENT FILE

BACKGROUND OF THE INVENTION

1. Field of the Invention

The present invention relates to a storage medium having a computer program, stored thereon, which is used for transmitting an image file such as a moving picture file or the like, and an electronic device to be used for transmitting an image file such as a moving picture file or the like.

2. Description of the Related Art

Recently, technologies for allowing users to share contents such as a moving picture or the like with other users connected via a network have been spread. For example, Japanese Laid-Open Patent Publication No. 2004-23756 discloses a server for, upon receiving a request from a user terminal, reading a URL (Uniform Resource Locator) of a content file and transmitting the URL to the user terminal.

Now, a situation is considered in which a user attempts to share a content having a large data size with another user via a network. In order to share such content with another user, the user needs to first transmit the content to be shared to a location such as a server in an image sharing site or the like. However, processing of transmitting a content having a large data size is generally time-consuming. Therefore, the user, who has transmitted the content, needs to wait until the transmission processing is completed and so cannot enjoy the contents sharing service comfortably.

SUMMARY OF THE INVENTION

The present invention, made in light of the above-described problem, has an object of providing a technology for executing transmission processing efficiently when a user wishes to share a content with another user.

An electronic device according to the present invention is connected to a communication network system which is connected to a server and to an external device. The electronic device includes an interface adapted to receive an instruction from a user of the communication network system; a processor adapted to determine information to be transmitted and a destination of the transmission based on the instruction from the user; and a communication module adapted to transmit the information to the destination determined by the processor. In the case where a content file is selected via the interface, when the selected content file has not been uploaded on the server, the transmission section, based on the determination of the processor, transmits the content file to the server, and after the transmission, transmits location information indicating a location where the content file is stored in the communication network system to the external device; and when the selected content file has been uploaded on the server, the transmission section transmits the location information indicating the location where the content file is stored to the external device based on the determination of the processor.

In one embodiment of the present invention, the processor holds at least one of information on a maximum data size of a content file permitted to be uploaded on the server and information on a maximum reproduction time of a content file permitted to be uploaded on the server. In the case where the selected content file has not been uploaded on the server, when the selected content file has a data size which is larger than the maximum data size, or when the selected content file has a reproduction time which is longer than the maximum reproduction time, the processor divides the selected content file to generate a plurality of divided files; and the transmission section transmits at least one of the plurality of divided files to the server, and after the transmission, transmits the location information indicating the location where the content file is stored in the communication network system to the external device.

In one embodiment of the present invention, the transmission section transmits all the plurality of divided files to the server.

In one embodiment of the present invention, when there are the plurality of divided files and at least one of the plurality of divided files has already been transmitted to the server, the communication module transmits, to the server, at least one divided file which has not been transmitted to the server among the plurality of divided files, and after the transmission, transmits the location information indicating the location where the content file is stored in the communication network system to the external device.

In one embodiment of the present invention, the transmission section transmits, to the server, all the divided files which have not been transmitted to the server among the plurality of divided files.

In one embodiment of the present invention, the electronic device further includes a storage device adapted to hold transmission history information indicating whether or not a content file has been uploaded on the server. The processor determines whether or not the selected content file has been uploaded on the server based on the transmission history information.

In one embodiment of the present invention, the server includes transmission history information indicating whether or not a content file has been uploaded on the server. The processor receives the transmission history information from the server and determines whether or not the selected content file has been uploaded on the server based on the transmission history information.

In one embodiment of the present invention, the interface receives an instruction from the user via an input device physically connected to the electronic device.

In one embodiment of the present invention, the interface receives an instruction from the user using another electronic device connected to the electronic device via the communication network system.

In one embodiment of the present invention, the content file is at least one of a moving picture file and an audio file.

In one embodiment of the present invention, the content file is a still image file.

In one embodiment of the present invention, the processor holds information on a maximum data size of a content file permitted to be uploaded on the server, and when the selected content file has not been uploaded on the server and the selected content file has a data size which is larger than the maximum data size, the processor reduces a still image of the selected content file to reduce the data size thereof.

A computer program according to the present invention is stored on a non-transitory computer-readable medium and is to be executed by a computer of an electronic device to be connected to a communication network system which is connected to a server and to an external device. The computer program has the computer execute the steps of receiving an instruction to select a content file from a user of the communication network system via an interface; determining whether or not the selected content file has been uploaded on the server; when the selected content file has not been uploaded on the server, transmitting the content file to the server and after the transmission, transmitting location information indicating a location where the content file is stored in the communication network system to the external device; and when the selected content file has been uploaded on the server, transmitting the location information indicating the location where the content file is stored to the external device.

According to the present invention, when the selected content file has not been uploaded on the server, the transmission section transmits the content file to the server, and after the transmission, transmits location information indicating a location where the content file is stored in the communication network system to the external device, based on the determination of the processor. By contrast, when the selected content file has been uploaded on the server, the transmission section transmits the location information indicating the location where the content file is stored to the external device based on the determination of the processor. Namely, when the content file has already been uploaded on the server, the content file is not uploaded in repetition. Since the content file is not uploaded on the server each time, the transmission processing can be executed efficiently when the user wishes to share the content with another user.

Other features, elements, processes, steps, characteristics and advantages of the present invention will become more apparent from the following detailed description of preferred embodiments of the present invention with reference to the attached drawings.

Portions (A) and (B) of FIG. 6 each show an example of data structure of transmission history information.

DETAILED DESCRIPTION OF PREFERRED EMBODIMENTS

Hereinafter, an electronic device in an embodiment according to the present invention will be described with reference to the drawings. In this embodiment, the electronic device is a personal computer (hereinafter, referred to as the "PC").

Hereinafter, a structure and an operation of a communication network system and an electronic device connectable to the communication network system in this embodiment will be described in detail.

1. STRUCTURE 1-1 Structure of the Communication Network System

Figure 1:
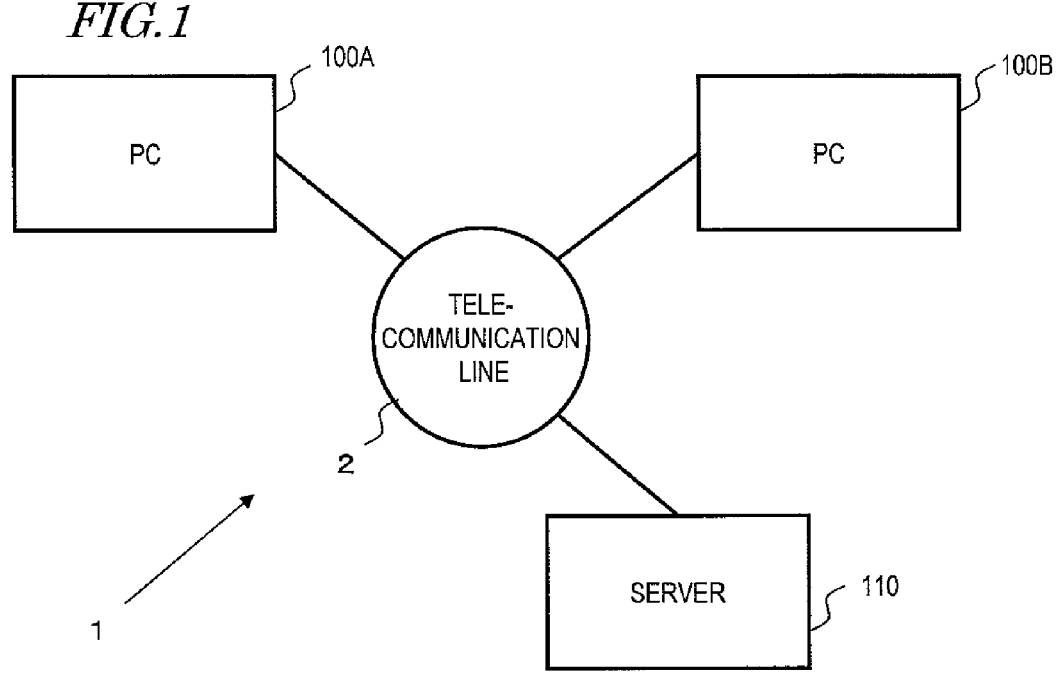
FIG. 1 shows a structure of a communication network system 1 according to an embodiment of the present invention.

FIG. 1 shows a structure of a communication network system 1 in this embodiment. The communication network system 1 includes a PC 100A, a PC 100B, and a server 110 in an image sharing site. The PC 100A, the PC 100B, and the server 110 are connected to each other via a telecommunication line 2.

In this embodiment, a case where a user of the PC 100A is to share a moving picture file with a user of the PC 100B will be described as an example. Namely, the PC 100A is an electronic device on the transmission side, and the PC 100B is an electronic device on the receiving side (external device).

The PC 100A can upload a moving picture file on the server 110 via the telecommunication line 2. The PC 100A in this embodiment can transmit a URL of the moving picture file uploaded on the server 110 to an external device such as the PC 100B or the like via the telecommunication line 2.

The server 110 in the image sharing site includes a storage medium (not shown) for storing content files such as, for example, the moving picture file transmitted from the electronic device (PC 100A) connected to the server 110 via the telecommunication line 2. The server 110 in the image sharing site provides each of moving picture files stored on the storage medium with a URL, which is information on a location on the telecommunication line 2.

The external device (PC 100B) connected to the communication network system 1 via the telecommunication line 2 specifies a URL received from, for example, the PC 100A to access the server 110. Owing to this, the user of the PC 100B can view the moving picture file on the server 110, which is stored at the location specified by the URL.

In this specification, the term "telecommunication line" means a communication network such as the Internet, an inhouse LAN, an intranet or the like. The communication network may be a public network or a private network.

The communication network system 1 in this embodiment operates as follows.

The PC 100A, which is an electronic device, receives an instruction from a user of the communication network system 1 via an interface described later. This instruction selects a content file and instructs uploading of the content file on the server 110.

When the selected content file has not been uploaded on the server 110, the PC 100A transmits the content file to the server 110, and after the termination of such uploading, transmits location information indicating a location where the content file is stored in the information network system 1 to the PC 100B, which is an external device. By contrast, when the selected content file has been uploaded on an external server 110, the PC 100A transmits to the PC 100B the location information indicating the location where the content file is stored.

Owing to this, the PC 100A can efficiently execute the transmission processing for sharing a moving picture file with another user.

1-2 Structure of the PC

Hereinafter, a structure of the PC 100A will be described as an example. The structure of the PC 100B is substantially the same as that of the PC 100A and will not be described. The PC 100B does not need to have a part of functions (e.g., transmission control function, selection function) executed by a CPU (Central Processing Unit; described later) of the PC 100A.

Figure 2:
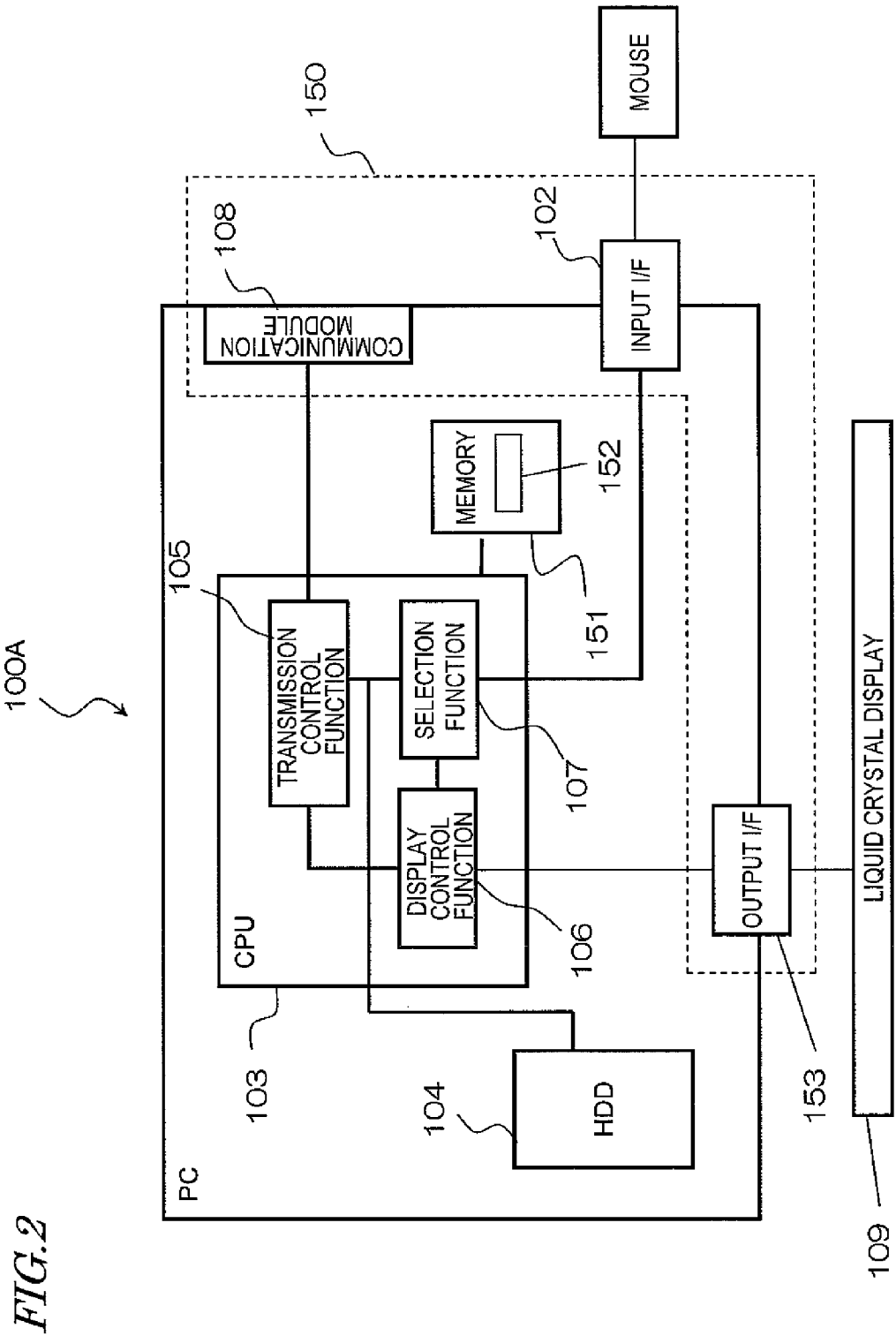
FIG. 2 shows a structure of a PC 100A.

FIG. 2 shows a structure of the PC 100A.

The PC 100A includes a CPU 103, a built-in hard disc drive (HDD) 104, an interface 150, and a memory 151.

The CPU 103 is a computer which executes a computer program 152 stored on the memory 151. By executing the computer program 152, the CPU 103 is allowed to have various functions and controls operations of other elements of the PC 100A. The various functions of the CPU 103 will be described later in detail.

The built-in HDD 104 is a storage device for storing content files such as moving picture files or the like or various types of information such as transmission history information described later or the like on a hard disc, which is a storage medium. Each of the content files such as the moving picture files or the like are stored on the built-in HDD 104 in association with a content ID for specifying the respective file. The built-in HDD 104 holds various functional programs processable by the CPU 103.

In this specification, the built-in HDD 104 is an example of storage medium for storing content files such as moving picture files or the like or various types of information such as transmission history information or the like. Instead of, or in addition to, the built-in HDD 104, an HDD (not shown) externally connected to the PC 100A or any other storage medium may be used.

The interface 150 includes an input interface (input I/F) 102, a communication module 108, and an output interface (output I/F) 153.

The input I/F 102 is an input terminal, connected to an input device such as a mouse or the like, for receiving an instruction (operation information) from the input device.

The communication module 108 is a network interface controller for transmitting content files such as moving picture files or the like or various types of information to a destination determined by the CPU 103. For example, the communication module 108 transmits various types of information or content files such as moving picture files to an external device connected thereto via the telecommunication line 2, i.e., the PC 100B, or the server 110 in the image sharing site. The communication module 108 also receives an instruction of a user from a PC as an external device or the like via the telecommunication line 2.

The output I/F 153 is an output terminal, connected to a liquid crystal display 109, for outputting a video signal to be displayed to the liquid crystal display 109.

The mouse 101 mentioned above transmits operation information from the user to the PC 100A via the interface 102. By operating the mouse 101, the user can select a file displayed on the liquid crystal display 109 or can cancel the selection of the file. By operating the mouse 101, the user can also press a button such as a share button or the like displayed on the liquid crystal display 109 to have the CPU 103 execute the function corresponding to the pressed button. Specifically, the CPU 103 executes the function such as, for example, a selection function 107 or a transmission control function 105 described later in accordance with the operation of the user.

In this embodiment, the mouse 101 is described as an example of input device acting as a trigger for having the CPU 103 execute the selection function 107. For carrying out the present invention, however, the input device is not limited to the mouse 101. The input device may be a keyboard, a touch pad provided on the liquid crystal display 109, or the like.

The liquid crystal display 109 is a display device for displaying content files such as moving picture files or the like transmitted from the output I/F 153. While viewing the content displayed on the liquid crystal display 109, the user can perform any of various operations such as selection of a moving picture file or the like using operation means such as the mouse 101 or the like. In this embodiment, the display device is not limited to the liquid crystal display 109 and may be any other display medium such as an organic EL display or the like.

In this embodiment, the mouse 101 and the liquid crystal display 109 are not elements of the PC 100A but are devices which are separate from, and connected to, the PC 100A. However, this structure is one example. In the case where, for example, the PC 100A is a laptop PC, a touch pad corresponding to the mouse 101 and the liquid crystal display 109 may be elements of the PC 100A.

Now, the CPU 103 will be described.

The CPU 103 can execute various functions such as the transmission control function 105, a display control function 106, the selection function 107 and the like. These functions are executed by the CPU 103 reading a corresponding functional program stored on the built-in HDD 104 and expanding the program on the memory. On the memory 151 shown in FIG. 2, the program 152 is expanded.

The transmission control function 105 is a function executed by the CPU 103 using the communication module 108 in order to upload a content file such a moving picture file or the like or in order to transmit various information such as a URL or the like. The selection function 107 is a function of acquiring location information, in the built-in HDD 104, of the content file such as the moving picture file selected by the user, and of selecting the content file such as the moving picture file or the like to be transmitted by the transmission control function 105. The display control function 106 is a function for executing control of displaying a content file such as a moving picture file or the like on the liquid crystal display 109.

2. OPERATION

Figure 3:
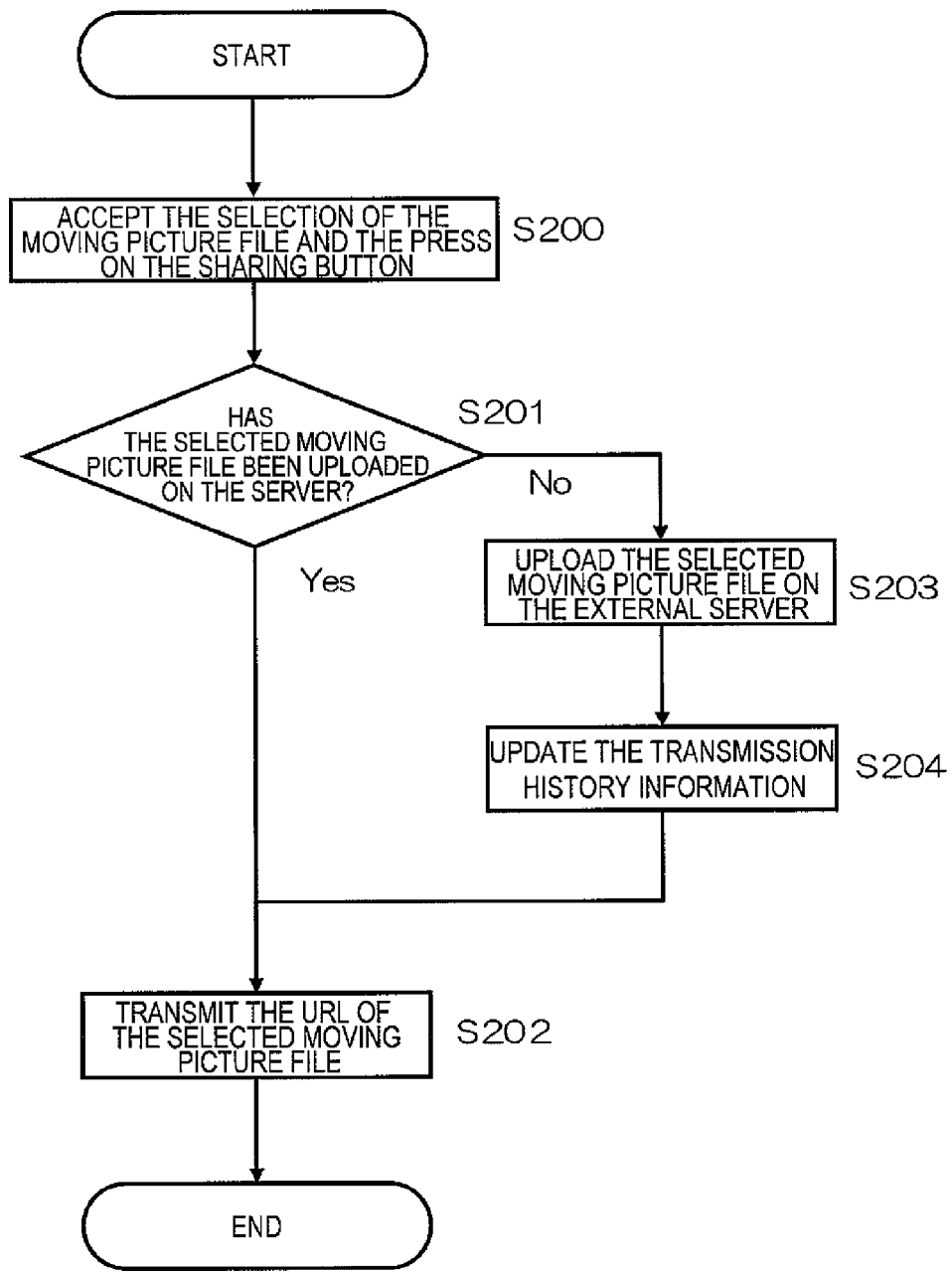
FIG. 3 is a flowchart showing a procedure of moving picture transmission processing.
Figure 4:
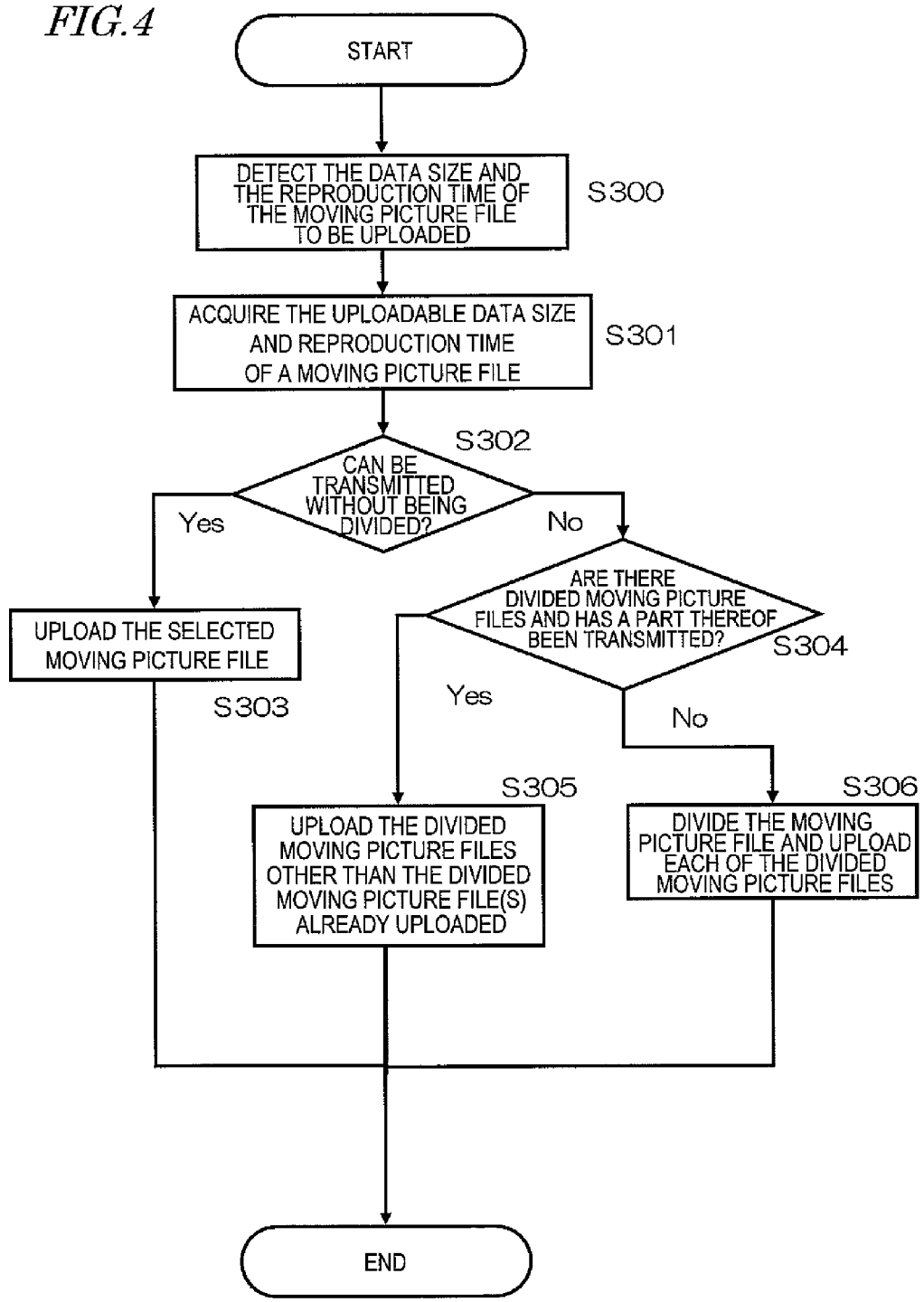
FIG. 4 is a flowchart showing a procedure of the moving picture transmission processing.

Now, a transmission control operation on a moving picture performed by the PC 100A in this embodiment will be described. FIG. 3 and FIG. 4 are each a flowchart showing a procedure of moving picture transmission processing.

Figure 5:
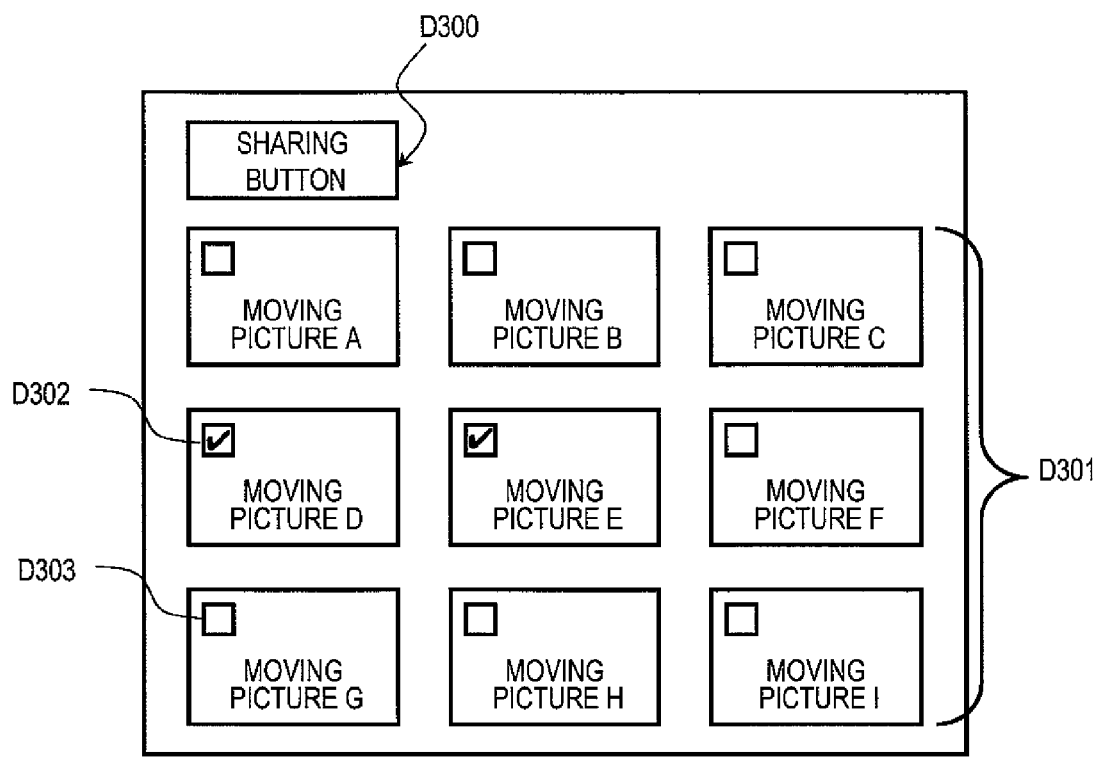
FIG. 5 shows an example of interface screen displayed on a liquid crystal display 109.

First, the user selects a moving picture file that he/she wishes to share and presses a "share button". Then, the CPU 103 accepts such an operation (S200). For example, FIG. 5 is an example of interface screen displayed on the liquid crystal display 109. In the screen shown in FIG. 5, a list D301 of thumbnail images of the moving picture files stored on the built-in HDD 104 is displayed. On each thumbnail image, a checkbox represented by D302 or D303 is displayed. Above the list of the thumbnail images of the moving picture files, a share button D300 is displayed.

When the user selects a thumbnail image of a moving picture file displayed on the liquid crystal display 109 using the mouse 101, the checkbox of the selected thumbnail image is checked. D302 shows a state where the checkbox is checked. D303 shows a state where the checkbox is not checked. The user can select a plurality of moving picture files from the list of the thumbnail images of the moving picture files. At this point, the checkboxes of the selected moving pictures are checked.

When completing the selection of the moving picture file to be shared with the PC 100B, the user presses the share button D300. A press on the share button D300 means that an instruction to upload the selected moving picture file has been input by the user. Upon accepting the press on the share button D300, the CPU 103 starts the transmission processing in order to share the selected moving picture file with the PC 100B. At this point, the CPU 103 recognizes the selected moving picture file by means of the selection function 107. When a plurality of moving picture files have been selected (when there are plurality of moving picture files with the checkboxes being checked), the CPU 103 recognizes each thereof. Regarding each of the recognized moving picture files, the CPU 103 determines, using the transmission control function 105, whether or not the moving picture file needs to be uploaded based on the transmission history information in the built-in HDD 104 (S201).

Portion (A) of FIG. 6 shows an example of data structure of the transmission history information. The transmission history information includes, regarding each of moving picture files having a history of being uploaded on the server 110 in the past, a file name, a content ID, a total reproduction time of the moving picture file, a reproduction time of a part of the moving picture file in the case where the part has been uploaded, and location information (URL) indicating a location where the moving picture file is stored in the communication network system 1. The transmission history information in this embodiment may include information, such as a data size, a file format or the like of the moving picture file, as a part thereof.

By referring to the transmission history information, the CPU 103 can determine whether or not a moving picture file has been uploaded on the server 110 in the past. Specifically, the CPU 103 determines whether or not each of the moving picture files recognized by means of the selection function 107 has been uploaded on the server 110 in the past in accordance with whether or not the content ID associated with the respective moving picture file is present in the list in the transmission history information. The "content ID" is identification information attached to each of the moving picture files by, for example, the CPU 103 of the PC 100A.

Regarding a case where the selected moving picture file has not been uploaded on the server 110 in the past or only a part thereof has been uploaded on the server 110 in the past (No in step S201), the details will be described later.

When the entirety of the selected moving picture file has been uploaded on the server 110 (Yes in step S201), the CPU 103 transmits the URL of the selected moving picture file to the PC 100B via the telecommunication line 2 (S202). The determination on whether or not the entirety of the moving picture file has been uploaded on the server 110 in the past can be made by comparing the total reproduction time of the moving picture file against the reproduction time of the part of the moving picture file having a history of being uploaded, which are both included in the transmission history information. For example, a moving picture A shown in portion (A) of FIG. 6 is now paid attention to. The "total reproduction time" of the moving picture A is "5:23". The "reproduction time of the part having a history of being uploaded" is "0:00-5:23", which is the same as the total reproduction time. Therefore, the CPU 103 determines that the entirety of the moving picture A has been uploaded. Next, a moving picture E is paid attention to. The "total reproduction time" of the moving picture E is "15:02". The "reproduction time of the part having a history of being uploaded" indicates only the part of "0:00-6:00" and the part of "6:00-12:00". The part of "12:00-15:02" is missing. Therefore, the CPU 103 determines that the entirety of the moving picture E has not been uploaded.

Now, with reference to FIG. 4, uploading processing on a moving picture file executed when the moving picture file has not been uploaded on the server 110 in the past or only a part thereof has been uploaded on the server 110 in the past (No in step S201) will be described (the details of the operation in step S203 will be described).

FIG. 4 is a flowchart showing the details of the processing of uploading a moving picture file on the server in the image sharing site. When the data size and the reproduction time of the moving picture file are greater than maximum values set by the image sharing site, the CPU 103 uploads the moving picture file on the server 110 in the state where the moving picture file is divided into a plurality of parts.

The CPU 103 first detects the information on the data size and the reproduction time of the moving picture file (S300). Next, the CPU 103 acquires information on the maximum data size and the maximum reproduction time of a moving picture file which can be uploaded on the server 110 in the image sharing site at a time (S301). Steps S300 and S301 may be executed in the opposite order.

The CPU 103 compares the information on the data size and the reproduction time of the moving picture file acquired in step S300 and the information on the maximum data size and the maximum reproduction time of a moving picture file acquired in step S301, and determines whether or not the moving picture file needs to be divided for being uploaded (S302). It is assumed that, for example, the data size of the moving picture file to be uploaded is 130 MB and the maximum data size which can be uploaded on the server 110 in the image sharing site at a time is 100 MB. The expression "at a time" means "by one cycle of uploading processing". Since the data size of the moving picture file to be uploaded exceeds the maximum data size set by the server, the CPU 103 determines that the moving picture file needs to be divided.

Now, by contrast, it is assumed that the data size of the moving picture file to be uploaded is 45 MB and the maximum data size which can be uploaded on the server 110 in the image sharing site at a time is 100 MB. Since the data size of the moving picture file to be uploaded is smaller than the maximum data size set by the server, the CPU 103 determines that the moving picture file does not need to be divided.

Similarly, it is assumed that the reproduction time of the moving picture file to be uploaded is "12:11" and the maximum reproduction time which can be uploaded on the server 110 in the image sharing site at a time is "10:00". Since the reproduction time of the moving picture file to be uploaded exceeds the maximum reproduction time set by the server, the CPU 103 determines that the moving picture file needs to be divided.

Now, by contrast, it is assumed that the reproduction time of the moving picture file to be uploaded is "9:11" and the maximum reproduction time which can be uploaded on the server 110 in the image sharing site at a time is "10:00". Since the reproduction time of the moving picture file to be uploaded is shorter than the maximum reproduction time set by the server, the CPU 103 determines that the moving picture file does not need to be divided.

When it is determined that the moving picture file to be uploaded does not need to be divided (Yes in S302), the CPU 103 executes the transmission control function 105 to upload the moving picture file as it is (S303).

When it is determined that the moving picture file to be uploaded needs to be divided (No in S302), the CPU 103 determines whether or not the moving picture file has already been divided into moving picture files (hereinafter, referred to as the "divided moving picture files") and a part of the divided moving picture files has already been transmitted (S304). The determination on whether or not such a part has been transmitted can be made in accordance with whether or not the part has a history of being uploaded.

When there are divided moving picture files and at least a part thereof has already been transmitted (Yes in S304), the CPU 103 uploads at least one divided moving picture file including at least one divided moving picture file which does not have a history of being uploaded (S305). At this point, the CPU 103 executes the transmission control function 105. The CPU 103 may upload all the divided moving picture files which do not have a history of being uploaded, or may upload a part of the divided moving picture files which do not have a history of being uploaded.

When the determination result of step S304 is No, the CPU 103 divides the moving picture file to generate two or more divided moving picture files. More specifically, the CPU 103 generates the divided moving picture files in conformity with the following rules. Regarding the data size of the divided moving picture files, the CPU 103 adjusts the data size of each divided moving picture file to be equal to or smaller than the maximum data size permitted by the server 110. Regarding the reproduction time of the divided moving picture files, the CPU 103 adjusts the reproduction time of each of the divided moving picture file to be equal to or shorter than the maximum reproduction time permitted by the server 110.

The CPU 103 executes the transmission control function 105 for each of the divided moving picture files to upload the divided moving picture file(s) on the server 110 (S306). When no instruction is given, the CPU 103 uploads all the divided moving picture files. By contrast, when a particular instruction is given, the CPU 103 may upload only a part of the divided moving picture files.

After the operations in steps S303, S305 and S306 described above, the CPU 103 updates the transmission history information (S204).

As described above, portion (A) of FIG. 6 shows transmission history information before uploading processing is carried out. Portion (B) of FIG. 6 shows transmission history information after the uploading processing on, for example, moving pictures C (D404) and E (D405) is carried out.

In the following description, the maximum reproduction time permitted by the server 110 is "6:00" as an example. The data size of each moving picture file is equal to or smaller than the data size permitted by the server 110.

The moving picture C shown in Portion (B) of FIG. 6 has a reproduction time of "3:14", which is shorter than the maximum reproduction time permitted by the server 110. Therefore, the moving picture C is entirely uploaded without the moving picture file being divided (the case in step S303). At this point, information on the moving picture C, namely, a file name, a content ID, the reproduction time of "3:14", and the reproduction time of the part having a history of being uploaded of "0:00-3:14" of the moving picture C have been added to the post-updating transmission history information. Therefore, the moving picture C now has a history of being uploaded. When the user wishes to share the moving picture C with another user in the future, the moving picture C does not need to be uploaded on the server 110 and only the URL thereof needs to be transmitted to the another user.

As shown in portion (A) of FIG. 6, the reproduction time of the moving picture E is "15:02", which exceeds the maximum reproduction time permitted by the server 110. Therefore, the moving picture E is uploaded as being divided. The part of "0:00-6:00" and the part of "6:00-12:00" of the moving picture E have a history of being transmitted. Therefore, as shown in portion (B) of FIG. 6, the divided moving picture file of the remaining part of "12:00-15:02" is uploaded and the history thereof is added. In this case also, as in the case of the moving picture C, the moving picture E now has a history of being uploaded. When the user wishes to share the moving picture E with another user in the future, the moving picture E does not need to be uploaded on the server 110 and only the URL thereof needs to be transmitted to the another user.

As described above, when the moving picture file selected in step S201 does not have a history of being uploaded, the CPU 103 executes the uploading processing on the moving picture file and then transmits the URL of the moving picture file to the PC 100B (S202). The uploading processing and the transmission processing on the URL are both executed by the CPU 103 using the communication module 108.

As described above regarding step S201, the CPU 103 determines whether or not each of the recognized moving picture files needs to be uploaded based on the transmission history information stored on the built-in HDD 104 using the transmission control function 105. Therefore, in the case where there are a plurality of recognized moving picture files, the moving picture file which has a history of being uploaded is not uploaded in repetition and only the URL thereof is transmitted to the PC 100B. In the case where there are a plurality of recognized moving picture files, the moving picture file which does not have a history of being uploaded is uploaded on the server 110 in the image sharing site so that the moving picture file can be shared with other users, and then the URL of the moving picture file is transmitted to the PC 100B. In this manner, the PC 100A determines whether or not to upload a moving picture file that the user wishes to share, based on whether or not the moving picture file has a history of being transmitted. Therefore, the PC 100A can execute the transmission processing efficiently.

3. SUMMARY

In this embodiment, in accordance with whether or not the selected moving picture file has been uploaded on the server 110, the PC 100A determines whether to upload the moving picture file and then transmit the URL thereof or to transmit the URL without uploading the moving picture file. Therefore, regarding the moving picture file which already has a history of being uploaded, the time for the uploading processing can be saved. By contrast, the moving picture file which does not have a history of being uploaded can be once uploaded so that the moving picture file can be shared with other users and then the URL thereof can be transmitted. Accordingly, the PC 100A can execute the transmission processing efficiently for sharing a moving picture file with another user.

When the moving picture file selected by the selection function 107 has been partially uploaded on the server 110, the transmission control function 105 of the PC 100A provides control so that the part of the moving picture file already uploaded on the server 110 is not uploaded on the server 110 and a part of the moving picture file including at least the remaining part which has not been uploaded on the server 110 is uploaded on the server 110 and then the URL thereof is transmitted to the PC 100B.

Owing to this, when a part of the selected moving picture file has already been uploaded, such a part can be prevented from being uploaded in repetition. Therefore, the PC 100A can execute the transmission processing efficiently for sharing the moving picture file with another user.

The above-described embodiment is one preferable example of carrying out the present invention. However, the present invention is not limited to the above-described embodiment. Hereinafter, structures of modified examples encompassed in the scope of the present invention will be described.

In the above-described embodiment, a moving picture file is described as an example of content file to be transmitted. The present invention is not limited to this. For example, the content may be a still image, music, audio data or even a text.

In the above-described embodiment, the moving picture file to be transmitted is divided in order to reduce the data size thereof. Alternatively, the reduction may be realized by processing such as resolution reduction, compression, format conversion or the like. For example, the PC 100A may have a structure by which, when the reproduction time of the moving picture file to be transmitted is shorter than the maximum reproduction time permitted by the server 110 but the data size thereof exceeds the maximum data size permitted by the server 110, the CPU 103 converts the moving picture file to be transmitted as described above.

When the content is a still image and the data size thereof is larger than the maximum data size permitted by the server in the image sharing site, the CPU 103 may execute reduction conversion processing in order to reduce the data size thereof.

This is also applicable to when the content is not a still image but music or audio data. The CPU 103 may execute conversion processing of reducing a bit rate of the music file or the audio data file in order to reduce the data size thereof. Alternatively, the CPU 103 may divide the music file or the audio data file. When the content is a text, the CPU 103 may execute compression processing or format conversion processing in order to reduce the data size thereof.

In the above-described embodiment, when the reproduction time of the moving picture file to be transmitted is "15:02" and the maximum reproduction time permitted by the server 110 is "6:00", the moving picture file to be transmitted is divided into the part of "0:00-6:00", the part of "6:00-12:00" and the part of "12:00-15:02". The present invention is not limited to this, and the moving picture file is divided into parts having any reproduction time equal to or shorter than the maximum reproduction time permitted by the server 110. For example, in the above case, the moving picture file to be transmitted may be divided into a part of "0:00-6:00", a part of "6:00-10:30" and a part of "10:30-15:02".

In the above-described embodiment, the URL is mentioned as an example of location information. In this specification, the "URL" encompasses a concept of an address uniquely identifying the server 110 on the telecommunication line 2 and an address uniquely identifying each moving picture file in the server 110 being combined. The "URL" encompasses a concept of a port number, a relative path, a query or the like being additionally combined. The "URL" may include a description of an IP address, a PC name which is uniquely identifiable on the network, or a full path or a relative path in the PC. These are concepts collectively referred to as the so-called "URI (Uniform Resource Identifier)". In this specification, any information which indicates the location of the content file that the user wishes to transmit and which can be quoted in order to acquire the content file in another PC connected via the telecommunication line 2 is usable as the "URL" referred to in the above-described embodiment.

In the above-described embodiment, the CPU 103 executes the transmission control function 105, the display control function 106 and the selection function 107 by way of a program. The present invention is not limited to this. A dedicated circuit which can execute each function is also usable for the present invention.

In the above-described embodiment, the PC 100A receives an instruction from the user via the input interface such as a mouse 101 or the like physically connected to the PC 100A. The input interface does not need to be physically connected to the PC 100A. For example, the user may input an instruction to the PC 100A from another PC (not shown) connected to the PC 100A by a network. In this case, the other PC and an input device thereof (mouse, etc.) act, as a whole, as an interface for the PC 100A. The "another PC" does not need to be the PC 100B.

In the above-described embodiment, it is determined whether or not the moving picture file to be transmitted by the user has already been uploaded on the server 110 by referring to the transmission history information held on the built-in HDD 104 of the PC. The present invention is not limited to this. For example, the server may hold the transmission history information. The PC 100A may inquire of the server 110 in the image sharing site whether or not the moving picture file to be transmitted has already been uploaded, and based on the result, determine whether or not the moving picture file needs to be uploaded. Namely, any means based on which it can be determined whether or not the moving picture file to be transmitted has already been uploaded on the server 110 is usable for the present invention.

In the above-described embodiment, the transmission control function 105 and the selection function 107 are executed as being stored on the PC in advance. The present invention is not limited to this. Namely, storage mediums such as CD-ROMs and the like having a program, stored thereon, for having the PC execute functions equivalent to those in the above embodiment are encompassed in the scope of the present invention.

In the above-described embodiment, the transmission terminal and the receiving terminal of the moving picture file are both PCs. The electronic device according to the present invention is not limited to a PC. The electronic devices acting as the transmission terminal and the receiving terminal may be, for example, digital still cameras, digital video cameras, mobile phones or tablet terminals having the above-described communication function. Such an electronic terminal acting as the transmission terminal does not have an video shooting function. Any electronic device which can perform the above-described operations on the existing content files using a communication function of its own is usable for the present invention.

The present invention is not limited to being applied to a PC but is applicable to any other electronic device which can execute the operations of the present invention.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2010-155648 filed on Jul. 8, 2010 and No. 2011-149256 filed on Jul. 5, 2011, the entire contents of which are hereby incorporated by reference.

What is claimed is:

1. A transmission control device to be connected to a communication network system which is connected to a server and to an external device, the transmission control device comprising:

an interface adapted to receive an instruction from a user of the communication network system;

a processor adapted to determine a content file to be transmitted and an external device as a destination of the transmission based on the instruction from the user; and a communication module adapted to transmit the content file to the destination determined by the processor, in the form of a plurality of divided files;

wherein:

the processor is adapted to determine, in the case where the content file is selected via the interface, whether at least one of the plurality of divided files has been already transmitted to the server prior to receipt of the instruction from the user, when the selected content file has been divided into the plurality of divided files, and none of the plurality of divided files has been transmitted to the server, the communication module, based on the determination of the processor, transmits each of plurality of divided files to the server, when at least one of the plurality of divided files has been already transmitted to the server, the communication module, based on the determination of the processor, transmits at least one divided file which has not been transmitted to the server among the plurality of divided files and does not retransmit at least one of the divided files that has been already transmitted, and after the transmission of the plurality of divided files, the communication module transmits location information indicating a location where the plurality of divided files are stored in the server to the external device.

2. The transmission control device of claim 1, wherein:
the processor holds at least one of information on a maximum data size of a content file permitted to be uploaded on the server and information on a maximum reproduction time of a content file permitted to be uploaded on the server; and when the selected content file has a data size which is larger than the maximum data size, or when the selected content file has a reproduction time which is longer than the maximum reproduction time, the processor divides the selected content file to generate the plurality of divided files.

3. The transmission control device of claim 2, wherein the communication module transmits all the plurality of divided files to the server.

4. The transmission control device of claim 2, wherein the content file is at least one of a moving picture file and an audio file.

5. The transmission control device of claim 1, wherein the communication module transmits, to the server, all the divided files which have not been transmitted to the server among the plurality of divided files.

6. The transmission control device of claim 1, further comprising a storage device adapted to hold transmission history information indicating whether or not a content file has been uploaded on the server,
wherein the processor determines whether or not the selected content file has been uploaded on the server based on the transmission history information.

7. The transmission control device of claim 1, wherein:
the server includes transmission history information indicating whether or not a content file has been uploaded on the server, and
the processor receives the transmission history information from the server and determines whether or not the selected content file has been uploaded on the server based on the transmission history information.

8. The transmission control device of claim 1, wherein the interface receives an instruction from the user via an input device physically connected to the transmission control device.

9. The transmission control device of claim 1, wherein the interface receives an instruction from the user using another transmission control device connected to the transmission control device via the communication network system.

10. The transmission control device of claim 1, wherein the content file is a still image file.

11. The transmission control device of claim 10, wherein:
the processor holds information on a maximum data size of a content file permitted to be uploaded on the server; and
when the selected content file has a data size which is larger than the maximum data size, the processor reduces a still image of the selected content file to reduce the data size thereof.

12. A computer program, stored on a non-transitory computer-readable medium, to be executed by a computer of a transmission control device to be connected to a communication network system which is connected to a server and to an external device, the computer program having the computer execute the steps of:
receiving an instruction to select a content file from a user of the communication network system via an interface;
determining the content file to be transmitted and the external device as a destination of the transmission based on the instruction; and
transmitting the content file to the destination in the form of a plurality of divided files;
wherein:
a determination is made whether at least one of the plurality of divided files of or not the selected content file has been transmitted to the server prior to receipt of the instruction from the user,
when the selected content file has been divided into the plurality of divided files, and none of the plurality of divided files has been transmitted to the server, transmitting each of plurality of divided files to the server,
when at least one of the plurality of divided files has been already transmitted to the server, transmitting at least one divided file which has not been transmitted to the server among the plurality of divided files and not retransmitting at least one of the divided files that has been already transmitted, and
after the transmission of the plurality of divided files, transmitting location information indicating a location where the plurality of divided files are stored in the server to the external device.

* * * * *